US012418126B2

(12) United States Patent
Nishijima

(10) Patent No.: US 12,418,126 B2
(45) Date of Patent: Sep. 16, 2025

(54) FEMALE TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Seido Nishijima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 295 days.

(21) Appl. No.: 18/038,857

(22) PCT Filed: Dec. 3, 2021

(86) PCT No.: PCT/JP2021/044549

§ 371 (c)(1),
(2) Date: May 25, 2023

(87) PCT Pub. No.: WO2022/124236

PCT Pub. Date: Jun. 16, 2022

(65) Prior Publication Data

US 2024/0055790 A1 Feb. 15, 2024

(30) Foreign Application Priority Data

Dec. 11, 2020 (JP) ................................ 2020-206268

(51) Int. Cl.
*H01R 13/11* (2006.01)
*H01R 13/04* (2006.01)
*H01R 13/18* (2006.01)

(52) U.S. Cl.
CPC .......... *H01R 13/111* (2013.01); *H01R 13/04* (2013.01); *H01R 13/18* (2013.01)

(58) Field of Classification Search
CPC ......... H01R 13/11; H01R 13/04; H01R 13/18
(Continued)

(56) References Cited

U.S. PATENT DOCUMENTS 8,920,201 B2 12/2014 Byrne
2020/0403342 A1 12/2020 Nishijima
(Continued)

FOREIGN PATENT DOCUMENTS

EP 1933425 A1 6/2008
EP 2779314 A1 9/2014
(Continued)

OTHER PUBLICATIONS

International Search Report issued on Feb. 8, 2022 for WO 2022/124236 A1 (6 pages).

*Primary Examiner* — Tulsidas C Patel
(74) *Attorney, Agent, or Firm* — Venjuris, P.C.

(57) ABSTRACT

A female terminal includes a tubular connecting portion including a first peripheral wall portion and a second peripheral wall portion and to be conductively connected to a columnar connecting portion, a pair of tip side plate portions projecting from circumferential end parts while being separated from each other, a resilient member for biasing the pair of tip side plate portions in directions approaching each other, and a stopper portion provided on a facing surface of the tip side plate portion. The stopper portion is provided at a position closer to the tubular connecting portion than a tip part of the tip side plate portion and limits displacements of the pair of tip side plate portions in the approaching directions. The pair of tip side plate portions and the first and
(Continued)

second peripheral wall portions are separated and displaced against the biasing forces of the resilient member.

6 Claims, 7 Drawing Sheets

(58) Field of Classification Search
USPC ........................................ 439/851, 852, 854
See application file for complete search history.

(56) References Cited

U.S. PATENT DOCUMENTS

| | | | | |
|---|---|---|---|---|
| 2021/0143561 | A1 | 5/2021 | Nishijima | |
| 2022/0285871 | A1 * | 9/2022 | Nishijima | H01R 13/111 |
| 2022/0294142 | A1 * | 9/2022 | Nishijima | H01R 13/15 |
| 2023/0170637 | A1 * | 6/2023 | Nishijima | H01R 13/04 439/816 |
| 2024/0063566 | A1 * | 2/2024 | Nishijima | H01R 13/193 |

FOREIGN PATENT DOCUMENTS

| | | | |
|---|---|---|---|
| EP | 3336967 | A1 | 6/2018 |
| JP | 2016-024901 | A | 2/2016 |
| WO | 2013/073118 | A1 | 5/2013 |

* cited by examiner

FEMALE TERMINAL

CROSS REFERENCE TO RELATED APPLICATIONS

This application is a national phase of PCT application No. PCT/JP2021/044549, filed on 3 Dec. 2021, which claims priority from Japanese patent application No. 2020-206268, filed on 11 Dec. 2020, all of which are incorporated herein by reference.

TECHNICAL FIELD

The present disclosure relates to a female terminal.

BACKGROUND

Patent Document 1 discloses a female terminal, to which a male terminal including a substantially cylindrical columnar connecting portion is connected and which includes a substantially hollow cylindrical tubular connecting portion. In the female terminal described in Patent Document 1, a resilient contact piece folded rearward from a tip opening is provided inside the tubular connecting portion. By a resilient restoring force of this resilient contact piece, an end part of the resilient contact piece is pressed against the columnar connecting portion of the male terminal, whereby the male and female terminals are held in a contact state and electrically connected.

PRIOR ART DOCUMENT

Patent Document

Patent Document 1: JP 2016-024901 A

SUMMARY OF THE INVENTION

Problem to be Solved

In such a female terminal of a conventional structure, the end part of the resilient contact piece is pressed against the columnar connecting portion of the male terminal, whereby the male and female terminals are held in the contact state. Thus, there has been a limit in improving a contact pressure between the male and female terminals only by a spring force of the resilient contact piece. Further, it might have been difficult to stably maintain the contact pressure between the male and female terminals due to the aged deterioration of the resilient contact piece.

Accordingly, a female terminal of a novel structure is disclosed which can improve a contact pressure of a tubular connecting portion of a female terminal with a columnar connecting portion of a male terminal and suppress a reduction in the contact pressure between the male and female terminals.

Means to Solve the Problem

The present disclosure is directed to a female terminal with a tubular connecting portion including a first peripheral wall portion and a second peripheral wall portion arranged to face each other, the tubular connecting portion being conductively connected to a columnar connecting portion of a male terminal, a pair of tip side plate portions projecting radially outwardly of the tubular connecting portion from a pair of mutually facing circumferential end parts of the first and second peripheral wall portions while being separated from each other, the pair of tip side plate portions being deflectable and deformable in directions approaching each other, a resilient member for applying biasing forces to the first and second peripheral wall portions in the directions approaching each other by biasing the pair of tip side plate portions in the directions approaching each other, and a stopper portion provided on at least one of a pair of facing surfaces of the pair of tip side plate portions, the stopper portion projecting toward the other facing surface, the stopper portion being provided at a position closer to the tubular connecting portion than tip parts of the pair of tip side plate portions and limiting displacements of the pair of tip side plate portions in the approaching directions to maintain the tip parts of the pair of tip side plate portions in a separated state by coming into contact with the other facing surface, and the pair of tip side plate portions and the first and second peripheral wall portions being separated and displaced in directions opposite to the approaching directions against the biasing forces of the resilient member, thereby allowing insertion of the columnar connecting portion of the male terminal into the tubular connecting portion.

Effect of the Invention

According to the female terminal of the present disclosure, it is possible to improve a contact pressure of the tubular connecting portion of the female terminal with the columnar connecting portion of the male terminal and suppress a reduction in the contact pressure between the male and female terminals.

DETAILED DESCRIPTION TO EXECUTE THE INVENTION

Description of Embodiments of Present Disclosure

Figure 1:
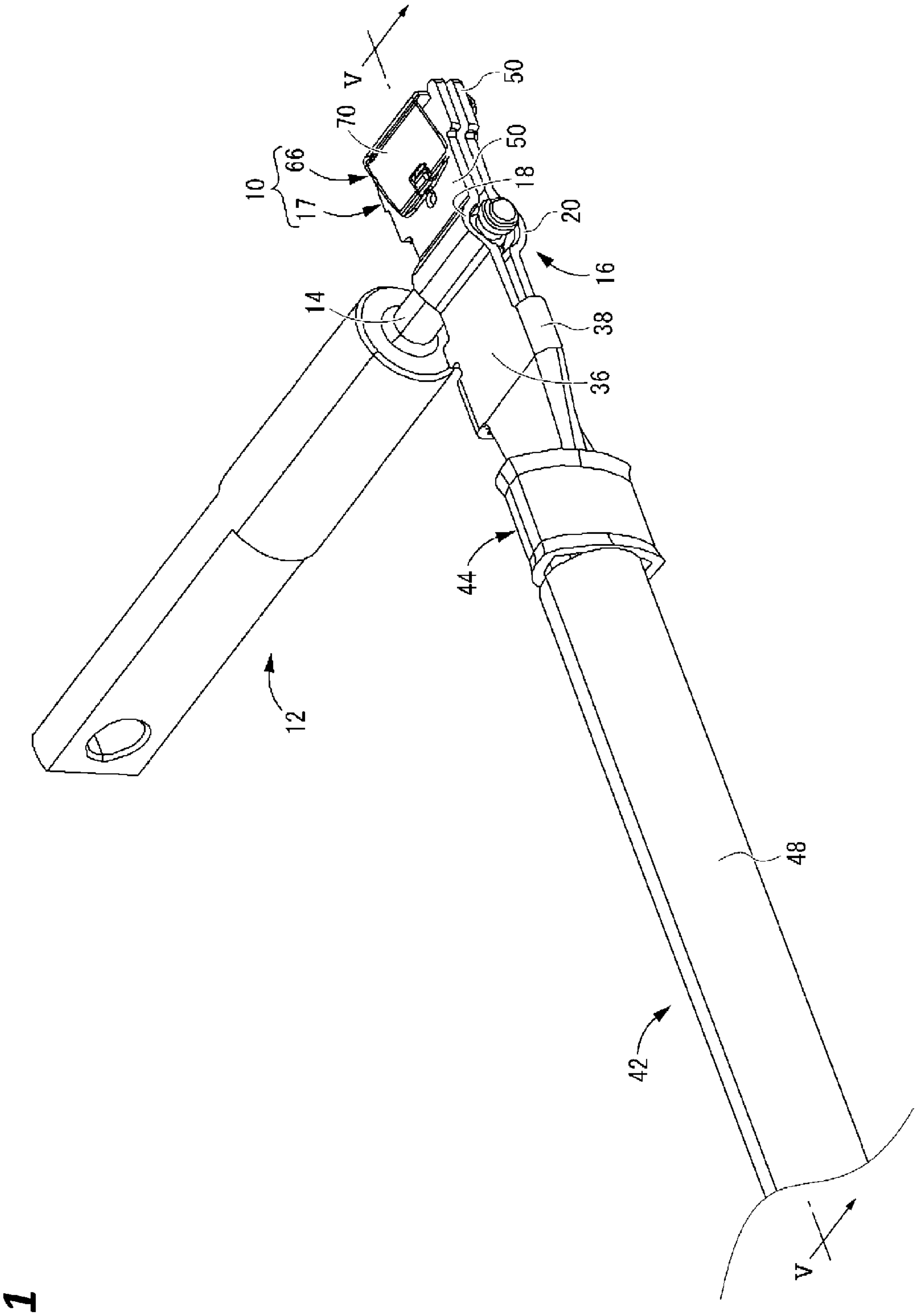
FIG. 1 is a perspective view of a female terminal according to one embodiment showing a state where a male terminal is inserted.
Figure 2:
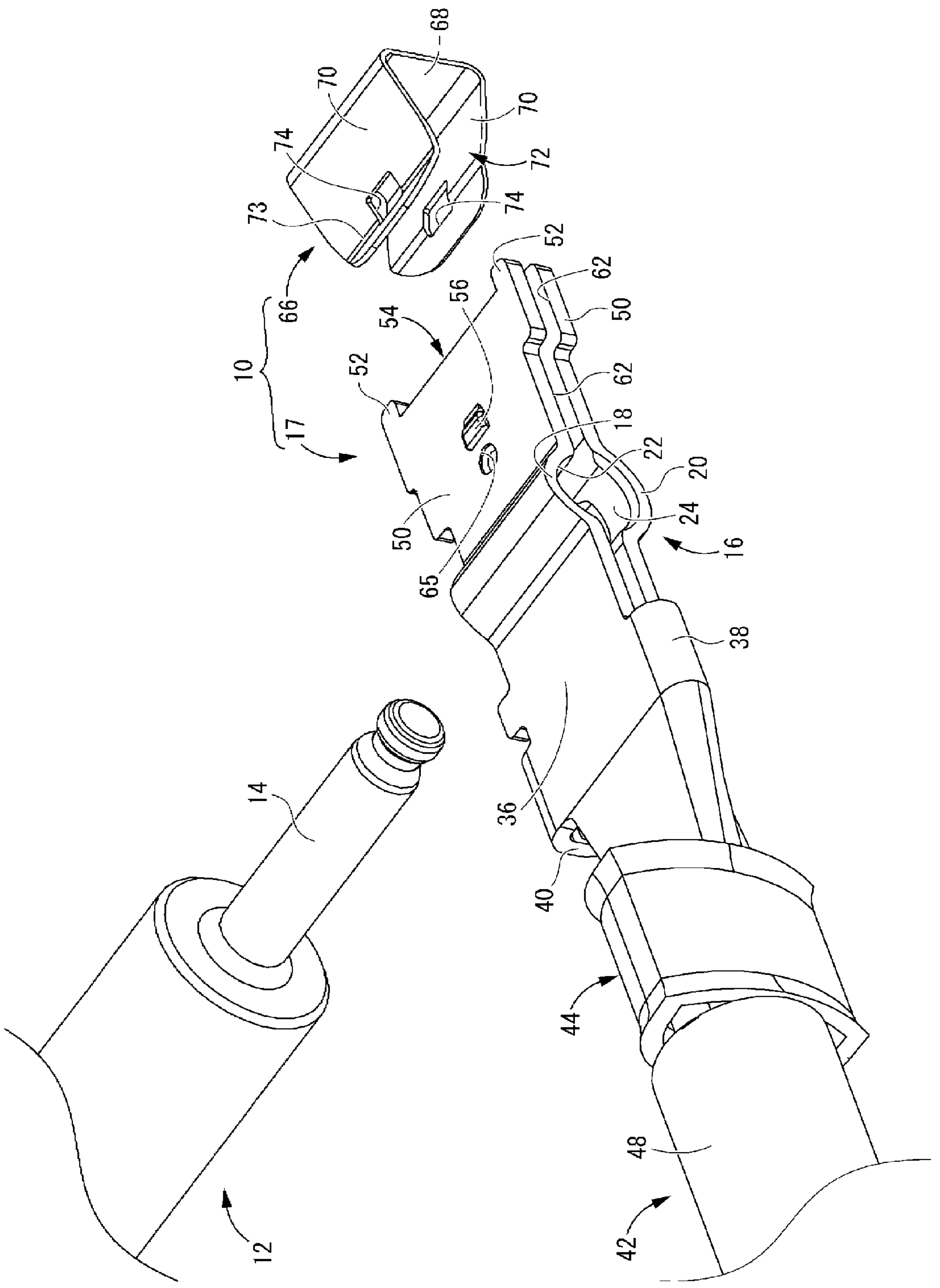
FIG. 2 is an exploded perspective view of the female terminal shown in FIG. 1.
Figure 3:
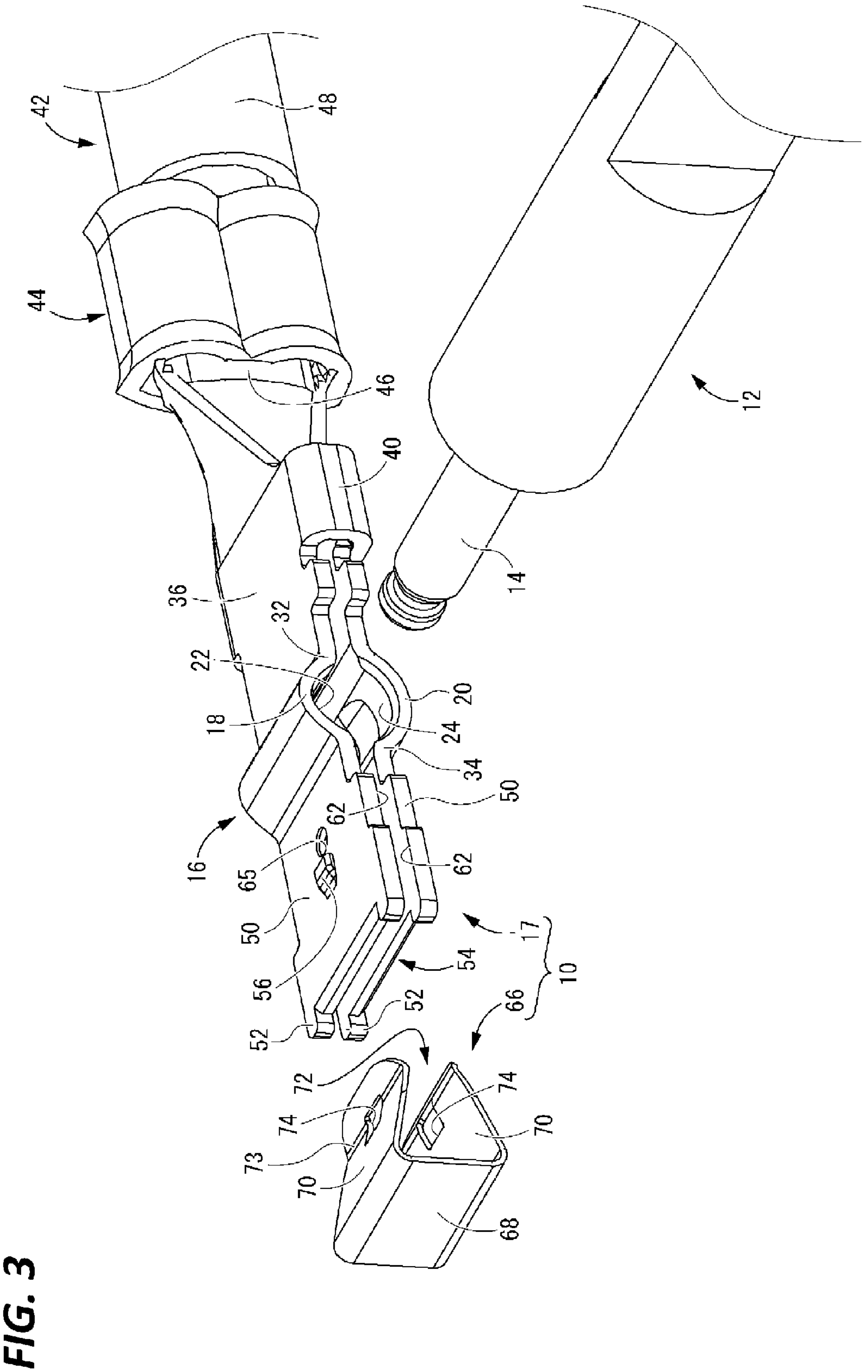
FIG. 3 is an exploded perspective view of the female terminal shown in FIG. 1 when viewed from another angle.

First, embodiments of the present disclosure are listed and described.

(1) The female terminal of the present disclosure is provided with a tubular connecting portion including a first peripheral wall portion and a second peripheral wall portion arranged to face each other, the tubular connecting portion being conductively connected to a columnar connecting portion of a male terminal, a pair of tip side plate portions projecting radially outwardly of the tubular connecting portion from a pair of mutually facing circumferential end parts of the first and second peripheral wall portions while being separated from each other, the pair of tip side plate portions being deflectable and deformable in directions approaching each other, a resilient member for applying biasing forces to the first and second peripheral wall portions in the directions approaching each other by biasing the pair of tip side plate portions in the directions approaching each other, and a stopper portion provided on at least one of a pair of facing surfaces of the pair of tip side plate portions, the stopper portion projecting toward the other facing surface, the stopper portion being provided at a position closer to the tubular connecting portion than tip parts of the pair of tip side plate portions and limiting displacements of the pair of tip side plate portions in the approaching directions to maintain the tip parts of the pair of tip side plate portions in a separated state by coming into contact with the other facing surface, and the pair of tip side plate portions and the first and second peripheral wall portions being separated and displaced in directions opposite to the approaching directions against the biasing forces of the resilient member, thereby allowing insertion of the columnar connecting portion of the male terminal into the tubular connecting portion.

According to the female terminal of the present disclosure, the tubular connecting portion to be conductively connected to the columnar connecting portion of the male terminal includes the first and second peripheral wall portions arranged to face each other. The pair of tip side plate portions projecting radially outward from the respective circumferential end parts of the first and second peripheral wall portions are separated from each other. The pair of tip side plate portions are biased in the directions approaching each other by the resilient member. In this way, biasing forces can be applied to the first and second peripheral wall portions in the directions approaching each other. By biasing the pair of tip side plate portions in the directions approaching each other by the separate resilient member in this way, the biasing forces can be applied in diameter reducing directions to the tubular connecting portion of the female terminal. The pair of tip side plate portions and the first and second peripheral wall portions are separated and displaced in the directions opposite to the approaching directions against the biasing forces of the resilient member, thereby allowing the insertion of the columnar connecting portion of the male terminal into the tubular connecting portion. Therefore, a contact pressure of the tubular connecting portion of the female terminal with the columnar connecting portion of the male terminal can be obtained by the resilient member separately mounted on the pair of tip side plate portions and can be improved as compared to the case where a contact pressure is obtained by a conventional resilient member provided in a tubular connecting portion.

In addition, the stopper portion located closer to the tubular connecting portion than the tip part is provided on the tip side plate portion, whereby displacements of the pair of tip side plate portions in the approaching directions by the biasing forces of the resilient member are limited and the tip parts of the pair of tip side plate portions are maintained in the separated state. Therefore, a relatively large facing gap between the first and second peripheral wall portions of the tubular connecting portion before the insertion of the columnar connecting portion of the male terminal can be secured by the separation of the tip parts of the pair of tip side plate portions, and insertion resistance of the columnar connecting portion of the male terminal against the tubular connecting portion of the female terminal can also be reduced. In addition, since the tip parts of the pair of tip side plate portions are separated from each other by the stopper portion before the insertion of the columnar connecting portion of the male terminal, a large separation distance between the tip parts of the pair of tip side plate portions after the insertion of the columnar connecting portion of the male terminal can be accordingly secured. As a result, it can be suppressed that the tip parts of the pair of tip side plate portions contact each other due to stress relaxation caused by the aged deterioration of a material of the pair of tip side plate portions. As a result, it is also possible to suppress or prevent a trouble to reduce the contact pressure of the tubular connecting portion with the columnar connecting portion due to the dispersion of the biasing forces of the resilient member toward the tip sides of the tip side plate portions. Further, the stopper portion is provided closer to the tubular connecting portion than the tip part of the tip side plate portion. Therefore, the stopper portion is less affected by the stress relaxation caused by the aged deterioration of the material of the pair of tip side plate portions than the tip part, and the mutual contact of the stopper portions due to the stress relaxation of the pair of tip side plate portions can also be suppressed.

(2) Preferably, the stopper portion is provided closer to the tubular connecting portion than parts of the pair of tip side plate portions having the biasing forces of the resilient member applied thereto. Since the stopper portion is closer to the tubular connecting portion than the parts of the pair of tip side plate portions having the biasing forces of the resilient member applied thereto, the stopper portion is even less affected by the displacements due to the stress relaxation of the material of the female terminal. Thus, the mutual contact of the stopper portions can also be advantageously suppressed and a larger inner diameter of the tubular connecting portion can be ensured by setting small working dimensional tolerances of the stopper portions.

(3) Preferably, at least one of the first and second peripheral wall portions includes a contact point portion projecting radially inward and, in the tubular connecting portion, an inner diameter at an end part on a front side in an inserting direction of the columnar connecting portion of the male terminal into the tubular connecting portion is larger than a radial dimension of the columnar connecting portion and an inner diameter in a part where the contact point portion is formed is smaller than the radial dimension of the columnar connecting portion.

The tip parts of the pair of tip side plate portions can be stably maintained in the separated state by limiting the displacements of the tip side plate portions in the approaching directions by the stopper portion. Thus, it becomes less necessary to cause the pair of tip side plate portions to project radially outward to increase the facing gap toward the tip parts thereof to increase the separation distance between the tip parts of the pair of tip side plate portions. As a result, the tip parts of the pair of tip side plate portions can be maintained in the separated state while a large inner diameter of the tubular connecting portion, which is a radial facing distance of the first and second peripheral wall portions, is ensured. In this way, the contact pressure between the columnar connecting portion and the tubular connecting portion is secured by making the inner diameter of the tubular connecting portion smaller than the radial dimension of the columnar connecting portion in the part where the contact point portions is formed, whereas the inner diameter of the tubular connecting portion can be made larger than the radial dimension of the columnar connecting portion in the end part on the front side in the inserting direction of the columnar connecting portion into the tubular connecting portion. Therefore, the columnar connecting portion needs not be press-fit into the tubular connecting portion and an insertion force of the male terminal into the female terminal can be reduced until the columnar connecting portion of the male terminal comes into contact with the contact point portion.

(4) Preferably, in (3) described above, both the first and second peripheral wall portions have an inner surface having an arcuate cross-sectional shape, an arcuate protrusion extending in a circumferential direction of the inner surface is provided on the inner surface of one of the first and second peripheral wall portions, and the contact point portion is constituted by the arcuate protrusion. Both the first and second peripheral wall portions have the inner surface having the arcuate cross-sectional shape and the arcuate protrusion extending in the circumferential direction of the inner surface is provided on the one inner surface. Therefore, the arcuate protrusion can be pressed into contact with a wide range of the outer peripheral surface of the columnar connecting portion of the male terminal press-fit into the tubular connecting portion of the female terminal with a high contact pressure and a wide contact area between the male and female terminals can be stably secured.

(5) Preferably, in (4) described above, linear contact portions extending in an axial direction of the tubular connecting portion are provided at a plurality of positions separated in the circumferential direction on the inner surface of the other of the first and second peripheral wall portions, and the contact point portions are constituted by the linear contact portions. The linear contact portions extending in the axial direction of the tubular connecting portion are provided at the plurality of positions separated in the circumferential direction on the inner surface of the other of the first and second peripheral wall portions. In this way, even if the swing of a wire is transmitted to the male terminal, a swing displacement of the male terminal can be blocked by the contact of the male terminal with a plurality of the linear contact portions. Therefore, the swing displacement of the male terminal can be blocked by the plurality of linear contact portions on the other of the first and second peripheral wall portions while the arcuate protrusion on one of the first and second peripheral wall portions is pressed into contact with the wide range of the outer peripheral surface of the columnar connecting portion of the male terminal with a high contact pressure, and both an increase in the contact area with the male terminal and the stable holding of the male terminal can be achieved.

(6) Preferably, the resilient member includes a coupling plate and a pair of pressing pieces projecting toward one side in a plate thickness direction of the coupling plate from both end parts of the coupling plate and inclined in directions approaching each other, and the resilient member is assembled with the pair of tip side plate portions while sandwiching the tip parts of the pair of tip side plate portions between the pair of pressing pieces. The resilient member can be manufactured with a simple structure, and the male and female terminals can be stably held in a connected state. Moreover, since the resilient member is assembled with the pair of tip side plate portions while sandwiching the tip parts of the pair of tip side plate portions between the pair of pressing pieces, the resilient member can be provided without causing the enlargement of the female terminal.

DETAILS OF EMBODIMENT OF PRESENT DISCLOSURE

A specific example of a female terminal of the present disclosure is described below with reference to the drawings. Note that the present disclosure is not limited to these illustrations and is represented by claims and intended to include all changes in the scope of claims and in the meaning and scope of equivalents.

Embodiment

Hereinafter, a female terminal 10 of one embodiment of the present disclosure is described using FIGS. 1 to 8C. The female terminal 10 is provided with a tubular connecting portion 16 to be conductively connected to a columnar connecting portion 14 of a male terminal 12. By inserting the columnar connecting portion 14 of the male terminal 12 into the tubular connecting portion 16 of the female terminal 10 and bringing the inner surface of the tubular connecting portion 16 and the outer surface of the columnar connecting portion 14 into contact with each other, the female terminal 10 and the male terminal 12 are electrically connected. Note that the male terminal 12 is not limited as long as the male terminal 12 includes the columnar connecting portion 14 and, for example, may be fixed to a terminal portion of a device by a bolt or the like or may be fixed to a wire. In the following description, a front side means a left side in FIG. 5 and a rear side means a right side in FIG. 5. An upper side means an upper side in FIG. 5 and a lower side means a lower side in FIG. 5. A left side means a left side in FIG. 6 and a right side means a right side in FIG. 6. Further, for a plurality of identical members, only some members may be denoted by a reference sign and the other members may not be denoted by the reference sign.

<Female Terminal 10>

The female terminal 10 is configured by assembling a clip spring 66 serving as a resilient member to be described later with a female terminal fitting 17. The female terminal fitting 17 is formed by press-working a metal flat plate substantially strip-like as a whole into a predetermined shape. Copper, copper alloy, aluminum, aluminum alloy and the like low in electrical resistance can be adopted as a metal constituting the metal flat plate. The female terminal fitting 17 includes the aforementioned tubular connecting portion 16.

<Tubular Connecting Portion 16>

Figure 5:
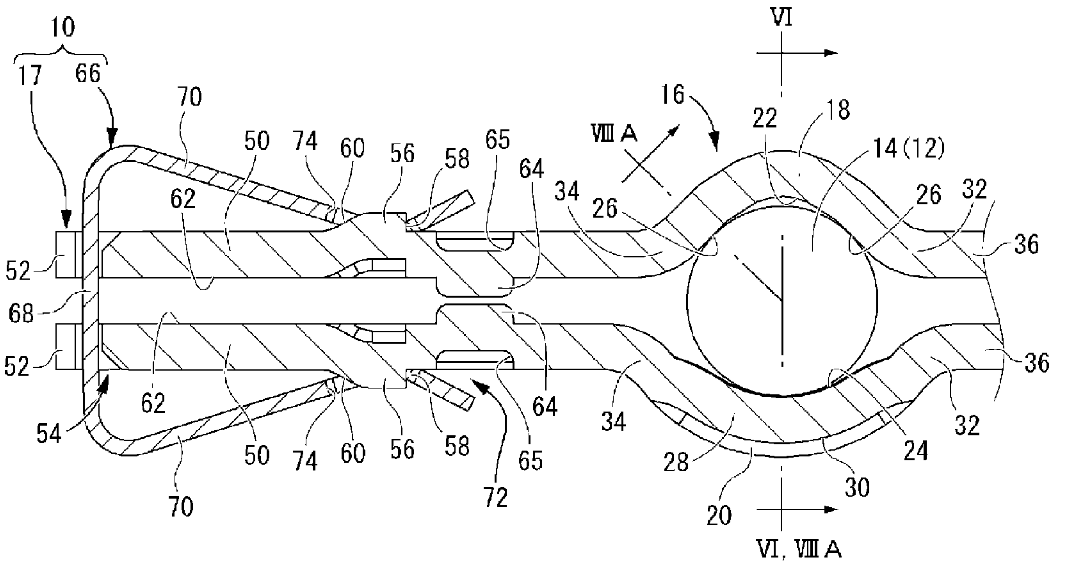
FIG. 5 is a section along V-V in FIG. 1.

The tubular connecting portion 16 has a substantially hollow cylindrical shape as a whole and is open on both sides in a lateral direction. That is, an axial direction of the tubular connecting portion 16 is the lateral direction. The tubular connecting portion 16 includes a first peripheral wall portion 18 and a second peripheral wall portion 20 arranged to face each other in a vertical direction. In this embodiment, the first peripheral wall portion 18 is located on an upper side and the second peripheral wall portion 20 is located on a lower side. Each of the first and second peripheral wall portions 18, 20 is a halved tubular body and has an inner surface 22, 24 having an arcuate cross-sectional shape in a vertical cross-section of the female terminal 10 shown in FIG. 5. Therefore, as also shown in FIG. 5, the outer surface of the columnar connecting portion 14 and the inner surfaces 22, 24 of the first and second peripheral wall portions 18, 20 contact each other when the columnar connecting portion 14 of the male terminal 12 is inserted into the tubular connecting portion 16 of the female terminal 10.

The first peripheral wall portion 18 has a constant cross-sectional shape over an entire length in the axial direction (lateral direction). The inner surface 22 of the first peripheral wall portion 18 may be a curved surface having a substantially constant curvature, but the curvature of the inner surface 22 of the first peripheral wall portion 18 is partially different in a circumferential direction in this embodiment. Specifically, on the inner surface 22, parts having a smaller curvature than a circumferential central part are provided at two positions on both end sides in the circumferential direction separated from the circumferential central part. In this way, in the vertical cross-section of the female terminal 10 shown in FIG. 5, the circumferential central part of the inner surface 22 has an arcuate shape having a substantially constant curvature, and parts extending substantially straight are connected to both ends in the circumferential direction of that arcuate part. In short, the two positions separated toward the both ends in the circumferential direction from the circumferential central part project more radially inward as compared to the case where the inner surface 22 is a curved surface having a substantially constant curvature.

Thus, when the columnar connecting portion 14 is inserted into the tubular connecting portion 16, the inner surface 22 of the first peripheral wall portion 18 and the outer surface of the columnar connecting portion 14 are in contact at the two positions of the inner surface 22 toward the both ends in the circumferential direction from the circumferential central part. Since the first peripheral wall portion 18 extends in the axial direction while having the constant cross-sectional shape, the first peripheral wall portion 18 and the columnar connecting portion 14 are in line contact at the two positions separated toward the both ends in the circumferential direction from the circumferential central part. In this embodiment, in the first peripheral wall portion 18, parts having a small curvature of the inner surface 22 and to be brought into contact with the outer surface of the columnar connecting portion 14 at the time of inserting the columnar connecting portion 14 are linear contact portions 26, and upper contact point portions with the columnar connecting portion 14 are constituted by these linear contact portions 26. That is, on the inner surface 22 of the first peripheral wall portion 18 serving as the other inner surface, the linear contact portions 26 serving as contact point portions projecting radially inward while extending in the axial direction of the tubular connecting portion 16 are provided at a plurality of positions (two positions) separated in the circumferential direction. Therefore, in this embodiment, the circumferential central part of the inner surface 22 and the outer surface of the columnar connecting portion 14 do not contact when the columnar connecting portion 14 is inserted into the tubular connecting portion 16.

An arcuate protrusion 28 projecting radially inward while extending in a circumferential direction of the inner surface 24 is provided in a central part in the axial direction (lateral direction) on the inner surface 24 of the second peripheral wall portion 20 serving as one inner surface. This arcuate protrusion 28 is formed to have a predetermined width (dimension in the lateral direction) and a predetermined dimension in the circumferential direction in a circumferential central part of the inner surface 24. In this embodiment, the arcuate protrusion 28 is formed by press-working the second peripheral wall portion 20, and a recess 30 open outward (downward) is formed at a position corresponding to the arcuate protrusion 28 in the outer surface of the second peripheral wall portion 20. Therefore, when the columnar connecting portion 14 is inserted into the tubular connecting portion 16, the arcuate protrusion 28 and the outer surface of the columnar connecting portion 14 contact each other and a lower contact point portion with the columnar connecting portion 14 is constituted by the arcuate protrusion 28. In this embodiment, a curvature of the inner surface of the arcuate protrusion 28 is smaller than that of the outer surface of the columnar connecting portion 14 in FIG. 5 and, particularly, a circumferential center of the inner surface of the arcuate protrusion 28 is the lower contact point portion with the columnar connecting portion 14.

Figure 6:
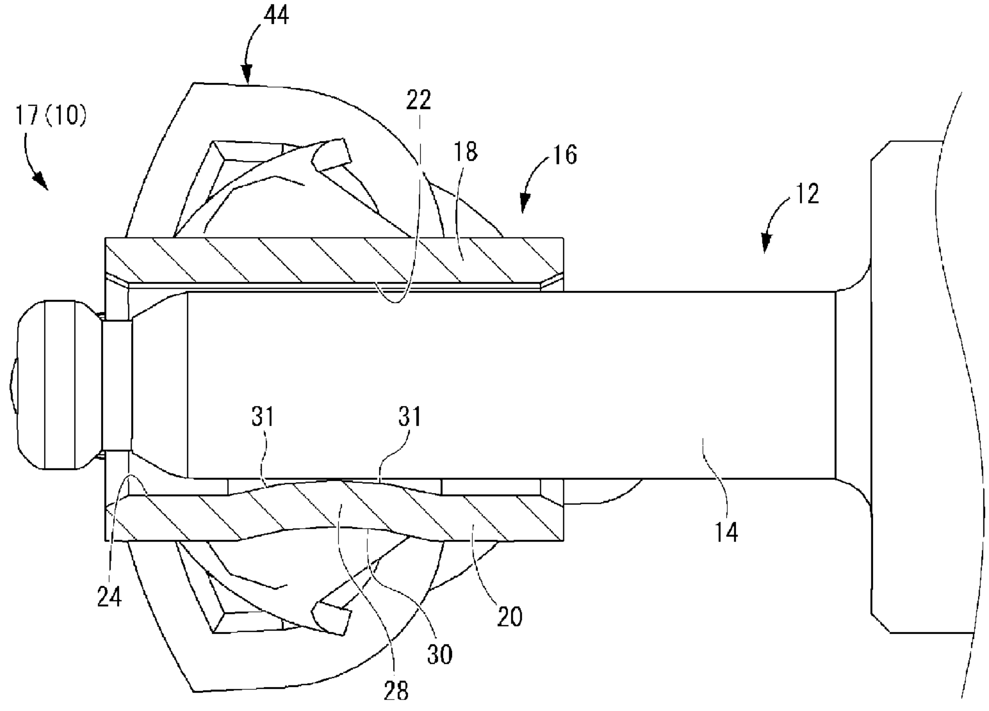
FIG. 6 is a section along VI-VI in FIG. 5.

Further, as also shown in FIG. 6, the arcuate protrusion 28 projects most radially inward in a lateral center. When the columnar connecting portion 14 is inserted into the tubular connecting portion 16, the lateral center of the arcuate protrusion 28 and the outer surface of the columnar connecting portion 14 contact each other. Therefore, particularly, the lateral center of the inner surface of the arcuate protrusion 28 is the lower contact point portion with the columnar connecting portion 14. On the inner surface of the arcuate protrusion 28, both sides across the lateral center are curved surfaces 31, 31 curved and gradually projecting radially inwardly of the tubular connecting portion 16 toward a lateral inner side.

Note that, as described later, an inner diameter $\phi\alpha$ (see FIGS. 7B and 8A) of the tubular connecting portion 16 is substantially equal to or slightly larger than an outer diameter $\phi\gamma$ (see FIG. 8A) of the columnar connecting portion 14 in the male terminal 12 in an initial state of the female terminal 10 having the clip spring 66 mounted on the female terminal fitting 17. Further, in the initial state of the female terminal 10 having the clip spring 66 mounted on the female terminal fitting 17, an inner diameter $\phi\beta$ (see FIGS. 7B and 8A) at the contact point portions of the tubular connecting portion 16 is slightly smaller than the outer diameter $\phi\gamma$ of the columnar connecting portion 14 in the male terminal 12. That is, in the tubular connecting portion 16, the inner diameter $\phi\alpha$ is substantially equal to or slightly larger than the outer diameter $\phi\gamma$ of the columnar connecting portion 14 at an end part on a front side (right side) in an inserting direction (direction from right to left) of the columnar connecting portion 14 into the tubular connecting portion 16. Further, in the tubular connecting portion 16, the inner diameter $\phi\beta$ is slightly smaller than the outer diameter $\phi\gamma$ of the columnar connecting portion 14 in parts where the contact point portions are formed.

In rear end parts of the first and second peripheral wall portions 18, 20 shaped as described above, circumferential end parts facing each other in the vertical direction are respectively first circumferential end parts 32, 32. This pair of first circumferential end parts 32, 32 are facing each other while being separated by a predetermined separation distance in the vertical direction. Further, in front end parts of the second and second peripheral wall portions 18, 20, circumferential end parts facing each other in the vertical direction are respectively second circumferential end parts 34, 34 serving as circumferential end parts. This pair of second circumferential end parts 34, 34 are facing each other while being separated by a predetermined separation distance in the vertical direction.

<Base End Side Plate Portions 36>

Figure 4:
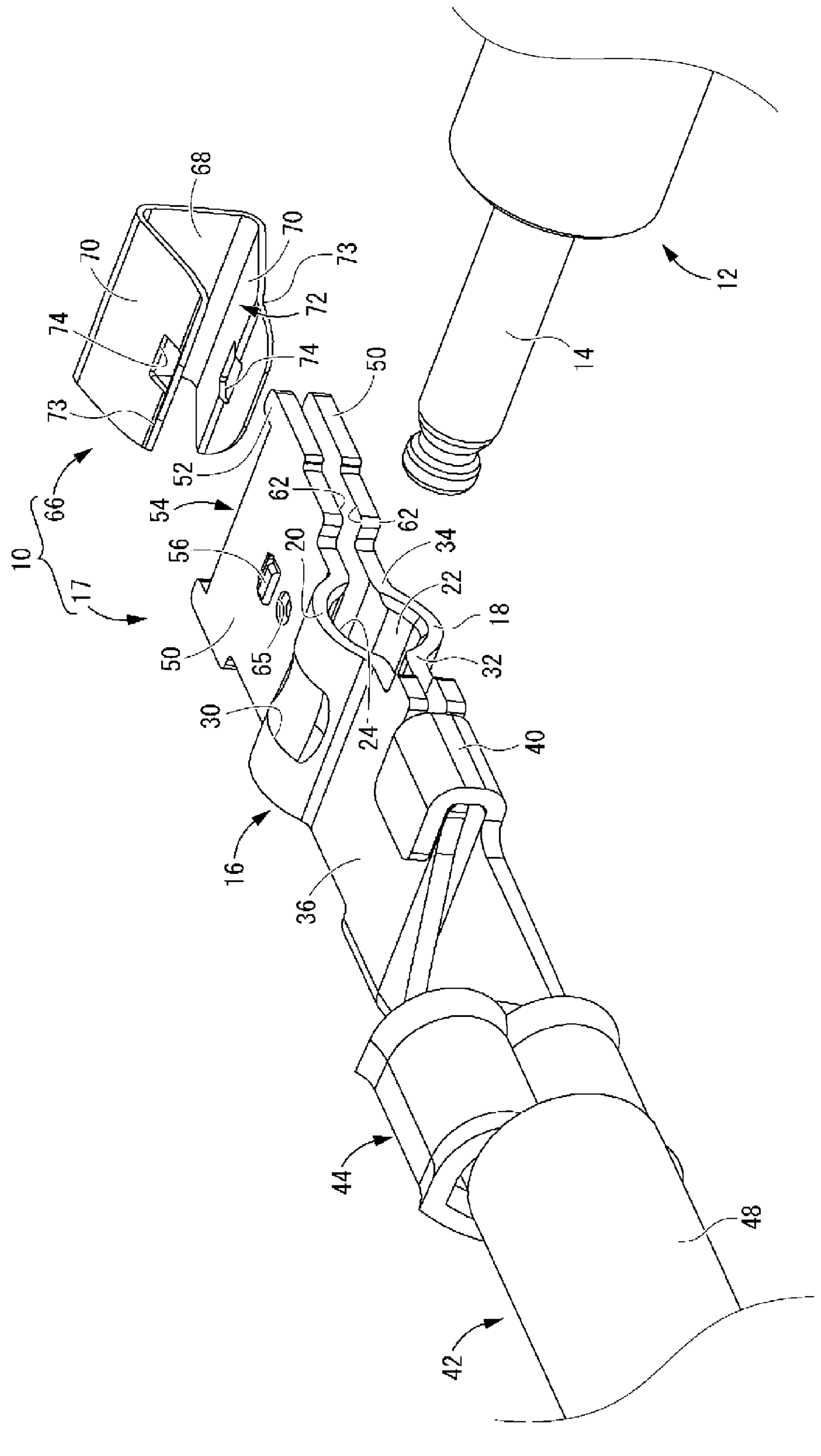
FIG. 4 is an exploded perspective view of the female terminal shown in FIG. 1 when viewed from still another angle.

The pair of first circumferential end parts 32, 32 are provided with a pair of base end side plate portions 36, 36 respectively projecting radially outwardly (rearwardly) of the tubular connecting portion 16. As described above, the female terminal fitting 17 is formed by press-working the substantially strip-like metal flat plate, and the pair of base end side plate portions 36, 36 are coupled to each other in rear parts of the base end side plate portions 36, 36. Each of the pair of base end side plate portions 36, 36 has a substantially rectangular shape when viewed from the vertical direction. The upper and lower base end side plate portions 36, 36 are coupled to each other by a coupling portion 38 provided on a left side in rear end parts thereof, and a crimping piece 40 projecting rightward is provided in the rear end part of the upper base end side plate portion 36. In this way, the lower base end side plate portion 36 is crimped and fixed to the upper base end side plate portion 36 as shown in FIG. 4 by bending the crimping piece 40 in forming the female terminal fitting 17 by press-working the metal flat plate. As a result, the upper and lower base end side plate portions 36, 36 are prevented from being displaced in directions separating from each other in the female terminal fitting 17 formed by press-working.

A wire crimping portion 44 to be crimped to a wire 42 is provided in a part behind the base end side plate portions 36, 36. The wire 42 is such a coated wire that a core wire 46 is covered by an insulation coating 48. The wire crimping portion 44 provided in a rear end part of the female terminal 10 (female terminal fitting 17) is fixed to the core wire 46 exposed by stripping the insulation coating 48 in an end part of the wire 42. Note that a method for fixing the core wire 46 to the female terminal 10 (female terminal fitting 17) is not limited to crimping and may be, for example, welding, fusion or the like. Note that the female terminal 10 may be fixed to the terminal portion of the device, instead of the wire 42, by a bolt or the like.

<Tip Side Plate Portions 50>

The pair of second circumferential end parts 34, 34 are provided with a pair of tip side plate portions 50, 50 respectively projecting radially outwardly (forwardly) of the tubular connecting portion 16. The pair of tip side plate portions 50, 50 respectively have a substantially rectangular shape when viewed from the vertical direction and are separated from each other in the vertical direction. That is, in the female terminal 10, the base end side plate portions 36, 36 are coupled to each other on one side in the front-rear direction with respect to the first and second peripheral wall portions 18, 20, and the tip side plate portions 50, 50 are separated from each other and cantilevered to form free ends on the other side in the front-rear direction with respect to the first and second peripheral wall portions 18, 20. As a result, the tip side plate portions 50, 50 are deflectable and deformable in directions approaching each other. Positioning protrusions 52, 52 projecting forward are provided on both sides in the lateral direction in a front end part of each of the tip side plate portions 50, 50. In other words, in the front end parts of the tip side plate portions 50, 50, lateral intermediate parts are located behind the positioning protrusions 52, 52. A clip spring mounting portion 54 on which the clip spring 66 to be described later is mounted is formed in the lateral intermediate parts in the front end parts of the tip side plate portions 50, 50.

On the outer surfaces in the vertical direction of the tip side plate portions 50, 50, protrusions 56, 56 projecting outward in the vertical direction are provided in widthwise central parts. Each protrusion 56 has a substantially triangular or trapezoidal shape when viewed from the lateral direction, the rear surface thereof is a vertical surface 58 expanding substantially in the vertical direction and the front surface thereof is an inclined surface 60 inclined to reduce an outward projection height in the vertical direction toward the front.

<Stopper Portions 64>

Out of a pair of facing surfaces (inner surfaces in the vertical direction) 62, 62 of the pair of tip side plate portions 50, 50, at least one facing surface 62 is provided with a stopper portion 64 projecting toward the other facing surface 62. In this embodiment, the stopper portions 64, 64 are provided in widthwise central parts of both of the pair of facing surfaces 62, 62, respectively project inward in the vertical direction and are facing each other. The respective stopper portions 64 are provided at positions closer to the tubular connecting portion 16 than tip parts of the pair of tip side plate portions 50, 50. Particularly, in this embodiment, the respective stopper portions 64 are provided behind (closer to the tubular connecting portion 16 than) the protrusions 56 provided on the outer surfaces of the tip side plate portions 50. These stopper portions 64, 64 are formed by press-working the tip side plate portions 50, 50, and recesses 65, 65 open outward in the vertical direction are formed at positions corresponding to the stopper portions 64, 64 in the outer surfaces of the tip side plate portions 50, 50.

Figure 7A:
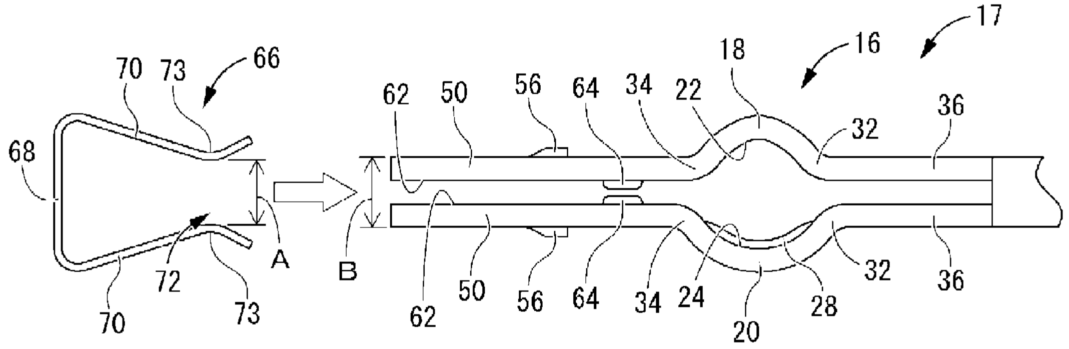
FIG. 7A is a diagram showing a model state of mounting a resilient member on a female terminal fitting.
Figure 7B:
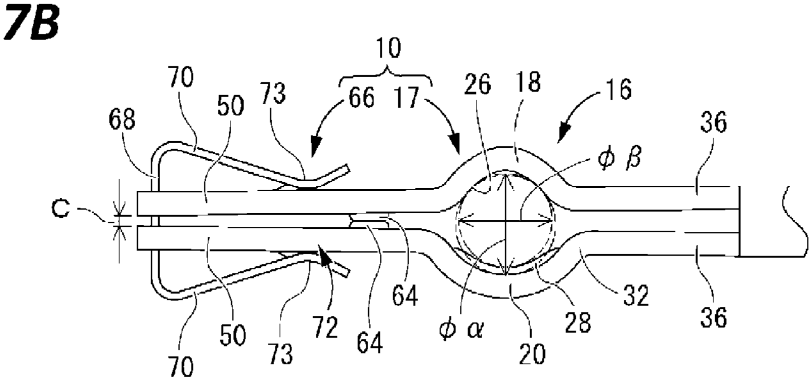
FIG. 7B is a diagram showing a model initial state of the female terminal in which the resilient member is mounted on the female terminal fitting.

Further, in this embodiment, each stopper portion 64 has a flat and substantially cylindrical shape having a height (dimension in the vertical direction) smaller than an outer diameter. A projection height of each of these stopper portions 64 is smaller than half the facing distance between the facing surfaces 62 and 62. In this way, as shown in FIG. 7A to be described later, the both stopper portions 64 do not contact each other in the female terminal fitting 17 before the clip spring 66 is mounted. Further, as shown in FIG. 7B to be described later, the stopper portions 64 contact the facing surfaces 62 of the facing tip side plate portions 50 to limit displacements of the pair of tip side plate portions 50, 50 in approaching directions and tip parts of the pair of tip side plate portions 50, 50 are maintained in a separated state when the clip spring 66 is mounted on the female terminal fitting 17. Since the stopper portions 64, 64 are provided on both of the pair of facing surfaces 62, 62 of the pair of tip side plate portions 50, 50 in this embodiment, the stopper portions 64 contact each other and one stopper portion 64 indirectly contacts the facing tip side plate portion 50 when the clip spring 66 is mounted on the female terminal fitting 17.

<Clip Spring 66>

The clip spring 66 serving as a resilient member for applying biasing forces to the first and second peripheral wall portions 18, 20 coupled behind the tip side plate portions 50, 50 in the directions approaching each other by biasing the tip side plate portions 50, 50 in the directions approaching each other is mounted on front end parts of the tip side plate portions 50, 50. The clip spring 66 is formed, using a strip plate of one of various metal materials capable of being press-worked or stamp-worked such as spring steel, stainless steel, brass, phosphor bronze and beryllium copper.

The clip spring 66 includes a coupling plate 68 substantially in the form of a rectangular flat plate when viewed from the front-rear direction and a pair of pressing pieces 70, 70 projecting toward one side (rear side in FIG. 5) in a plate thickness direction of the coupling plate 68 from both end parts of the coupling plate 68. Bent portions 73, 73 are provided in intermediate parts in a length direction of the pressing pieces 70, 70, and projecting tip parts of the pressing pieces 70, 70 extend from the bent portions 73, 73 in directions separating from each other. Accordingly, a facing distance between the pressing pieces 70, 70 is smallest at the bent portions 73, 73 provided in the intermediate parts in the length direction, and a gap between these bent portions 73, 73 serves as an insertion opening 72 for inserting the female terminal fitting 17 into the clip spring 66. As shown in FIG. 7A to be described later, a minimum opening dimension A of the insertion opening 72 of the clip spring 66 in a single state before being mounted on the female terminal fitting 17 is smaller than a vertical dimension B of the female terminal fitting 17 in a single state. Further, substantially rectangular locking recesses 74 penetrating through the pressing pieces 70 in the plate thickness direction are formed in widthwise centers of the bent portions 73, 73 of the pair of pressing pieces 70, 70.

The clip spring 66 shaped as described above is mounted on the pair of tip side plate portions 50, 50 from front. That is, the clip spring 66 is slid and displaced rearward with respect to the female terminal fitting 17 by inserting the tip side plate portions 50, 50 in the female terminal fitting 17 into the insertion opening 72 in the clip spring 66. In this way, the pair of pressing pieces 70, 70 in the clip spring 66 sandwich the tip side plate portions 50, 50 of the female terminal fitting 17 from outside in the vertical direction. Then, the respective protrusions 56 projecting outward in the vertical direction from the tip side plate portions 50, 50 are locked into the respective locking recesses 74 in the clip spring 66. In this way, the clip spring 66 is assembled with the pair of tip side plate portions 50, 50 with the tip parts (front end parts) of the pair of tip side plate portions 50, 50 sandwiched between the pair of pressing pieces 70, 70.

Particularly, since the front surfaces of the respective protrusions 56 are the inclined surfaces 60 and the projecting tip parts of the pressing pieces 70, 70 are inclined in the directions separating from each other, the projecting tip parts of the pressing pieces 70, 70 can easily ride over the respective protrusions 56. Further, the respective locking recesses 74 are stably locked by the vertical surfaces 58, which are the rear surfaces of the respective protrusions 56.

Note that the coil spring mounting portion 54 is provided on the lateral intermediate part in the front end part of the female terminal fitting 17. In this way, when the clip spring 66 is mounted on the coil spring mounting portion 54, the positioning protrusions 52, 52 provided on the tip side plate portions 50, 50 are located on both sides in the lateral direction of the coupling plate 68 as also shown in FIGS. 1 and 5. As a result, in an assembled state of the female terminal fitting 17 and the clip spring 66, the clip spring 66 is prevented from being shifted in position in the lateral direction with respect to the female terminal fitting 17.

Here, the pair of pressing pieces 70, 70 of the clip spring 66 are provided with the bent portions 73, 73 defining the minimum opening dimension A of the insertion opening 72 of the clip spring 66. The minimum opening dimension A of the insertion opening 72, which is a facing gap between the bent portions 73 and 73, is smaller than the vertical dimension B of the female terminal fitting 17 (tip side plate portions 50, 50). Thus, when the clip spring 66 is mounted on the front end parts of the tip side plate portions 50, 50, the tip side plate portions 50, 50 push and widen the insertion opening 72 of the female terminal fitting 17 outward in the vertical direction and the pressing pieces 70, 70 are resiliently deformed in the directions separating from each other. In this way, the clip spring 66 is assembled with the front end parts of the tip side plate portions 50, 50. Resilient restoring forces of these pressing pieces 70, 70 are applied as biasing forces to the front end parts of the tip side plate portions 50, 50 in the directions approaching each other. That is, parts of the tip side plate portions 50, 50 to be brought into contact with the bent portions 73 of the respective pressing pieces 70 in the clip spring 66 are parts to which the biasing forces by the clip spring 66 are applied. In this embodiment, since the bent portions 73, 73 are provided with the locking recesses 74, 74 in the pressing pieces 70, 70 of the clip spring 66, parts in the tip side plate portions 50, 50 where the protrusions 56, 56 are locked to the locking recesses 74, 74 are the parts to which the biasing forces by the clip spring 66 are applied.

Further, by applying the biasing forces to the tip side plate portions 50, 50 in the directions approaching each other, the second circumferential end parts 34, 34 of the first and second peripheral wall portions 18, 20 coupled behind the tip side plate portions 50, 50 are biased in the directions approaching each other. By applying outward external forces in the vertical direction to the tip side plate portions 50, 50 and the first and second peripheral wall portions 18, 20, the tip side plate portions 50, 50 and the first and second peripheral wall portions 18, 20 are displaced in the directions separating from each other against the biasing forces of the pressing pieces 70, 70.

<Connection of Male Terminal 12 and Female Terminal 10>

A model method for connecting the male terminal 12 and the female terminal 10 by inserting the columnar connecting portion 14 of the male terminal 12 into the tubular connecting portion 16 of the female terminal 10 shaped as described above is described using FIGS. 7A to 8C.

First, as shown in FIG. 7A, the clip spring 66 is assembled with the tip side plate portions 50, 50 of the female terminal fitting 17 from front. In this way, as shown in FIG. 7B, the female terminal 10 is completed. By mounting the clip spring 66 on the female terminal fitting 17, biasing forces are applied to the tip side plate portions 50, 50 and the first and second peripheral wall portions 18, 20 in the directions approaching each other by the clip spring 66 as described above. According to these biasing forces, the tip side plate portions 50, 50 are displaced in the directions approaching each other and the stopper portions 64, 64 provided on the facing surfaces 62, 62 of the tip side plate portions 50, 50 contact each other. In a contact state of the both stopper portions 64, 64 shown in FIG. 7B, the tip parts of the tip side plate portions 50, 50 are separated from each other by a predetermined separation distance C. Therefore, the stopper portions 64, 64 limit displacements of the pair of tip side plate portions 50, 50 in the approaching directions and maintain the tip parts of the pair of tip side plate portions 50, 50 in a separated state by coming into contact with each other.

Figure 8A:
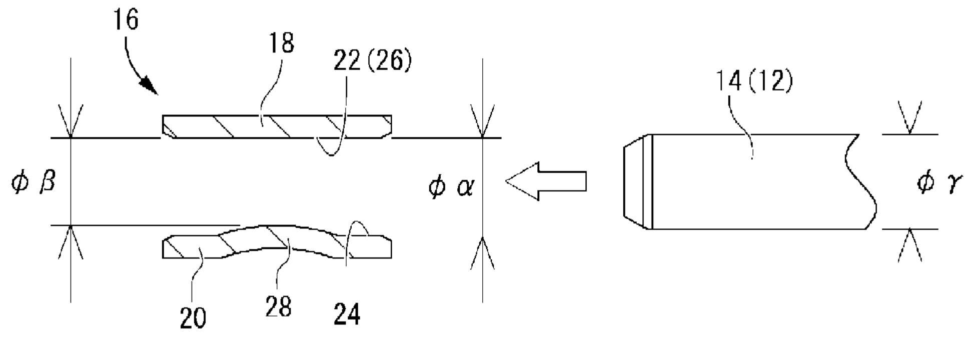
FIG. 8A is a diagram showing a model state when the male terminal is inserted into the female terminal with the female and male terminals shown by cross-sections along VIIIA-VIIIA in FIG. 5.

Further, the second circumferential end parts 34, 34 in the first and second peripheral wall portions 18, 20 are displaced in the directions approaching each other, whereby an inner diameter of the tubular connecting portion 16 in a state shown in FIG. 7B (initial state of the female terminal 10 before the insertion of the male terminal 12) is slightly smaller than that of the tubular connecting portion 16 in the state shown in FIG. 7A. Here, in the state shown in FIG. 7B, the inner diameter of the tubular connecting portion 16 (inner diameter of a virtual circle in contact with the inner surfaces 22, 24 of the first and second peripheral wall portions 18, 20) is ϕα. Further, an inner diameter at the contact point portions (linear contact portions 26, 26 and arcuate protrusion 28) provided in the tubular connecting portion 16 (inner diameter of a virtual circle in contact with the linear contact portions 26, 26 and the arcuate protrusion 28) is ϕβ. As shown in FIG. 8A, the inner diameter ϕα of the tubular connecting portion 16 in the state shown in FIG. 7B is substantially equal to or slightly larger than the outer diameter ϕγ of the columnar connecting portion 14 in the male terminal 12. Further, in the state shown in FIG. 7B, the inner diameter ϕβ at the contact point portions of the tubular connecting portion 16 is slightly smaller than the outer diameter ϕγ of the columnar connecting portion 14 in the male terminal 12.

Figure 8B:
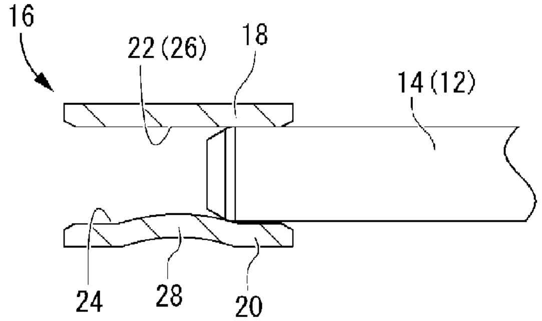
FIG. 8B is a diagram showing a model state immediately after the male terminal is inserted into the female terminal with the female and male terminals shown by the same cross-sections as in FIG. 8A.

The columnar connecting portion 14 of the male terminal 12 is inserted into the tubular connecting portion 16 of the female terminal 10 shaped as described above. As shown in FIG. 8B, the inner diameter ϕβ at the contact point portions of the tubular connecting portion 16 is slightly smaller than the outer diameter ϕγ of the columnar connecting portion 14. Thus, immediately after the columnar connecting portion 14 is inserted into the tubular connecting portion 16, the contact point portions (linear contact portions 26, 26 and arcuate protrusion 28) in the tubular connecting portion 16 and the outer surface of the columnar connecting portion 14 contact each other on the front side (right side) in the inserting direction (direction from right to left).

Figure 7C:
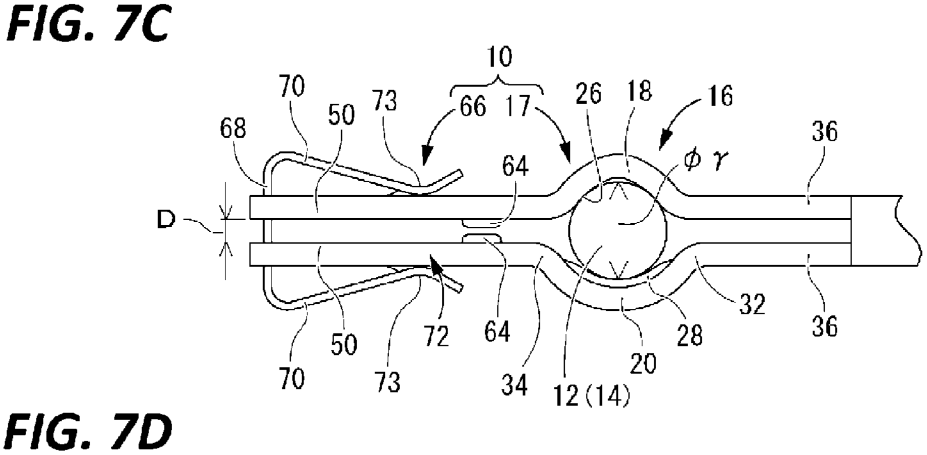
FIG. 7C is a diagram showing a model state where the male terminal is inserted in the female terminal.
Figure 8C:
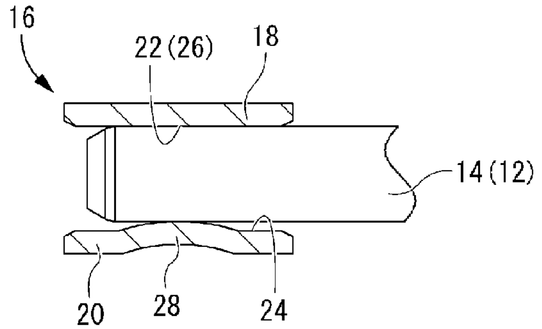
FIG. 8C is a diagram showing a model state while the male terminal is being inserted into the female terminal with the female and male terminals shown by the same cross-sections as in FIG. 8A.

By further inserting the columnar connecting portion 14 into the tubular connecting portion 16, the inner surface of the tubular connecting portion 16 is pushed and widened by the outer surface of the columnar connecting portion 14 and outward external forces in the vertical direction are applied to the first and second peripheral wall portions 18, 20. In this way, the first and second peripheral wall portions 18, 20 are separated and displaced in directions opposite to the directions approaching each other against biasing forces by the pressing pieces 70, 70 of the clip spring 66. As a result, as shown in FIGS. 7C and 8C, the columnar connecting portion 14 can be press-fit and inserted into the tubular connecting portion 16. Then, the contact point portions (linear contact portions 26, 26 and arcuate protrusion 28) in the tubular connecting portion 16 contact the intermediate part in the length direction of the columnar connecting portion 14, whereby the columnar connecting portion 14 is held in the tubular connecting portion 16 and the male and female terminals 12, 10 are electrically connected.

With the columnar connecting portion 14 inserted in the tubular connecting portion 16 in this way, the biasing forces by the pressing pieces 70, 70 of the clip spring 66 are applied to the first and second peripheral wall portions 18, 20. Therefore, a sufficient contact pressure with the columnar connecting portion 14 by the tubular connecting portion 16 (first and second peripheral wall portions 18, 20) is ensured.

Further, as shown in FIG. 7C, the tip side plate portions 50, 50 and the first and second peripheral wall portions 18, 20 are displaced in the directions separating from each other by inserting the columnar connecting portion 14 into the tubular connecting portion 16. In this way, the both stopper portions 64, 64 face each other across a gap and a separation distance D between the tip parts of the tip side plate portions 50, 50 becomes larger than the separation distance C between the tip parts of the tip side plate portions 50, 50 in the state of FIG. 7B. In a state of FIG. 7C, the stopper portions 64, 64 provided on the tip side plate portions 50, 50 are also not in contact with each other. As a result, the biasing forces by the pressing pieces 70, 70 of the coil spring 66 are stably applied to the first and second peripheral wall portions 18, 20.

Figure 7D:
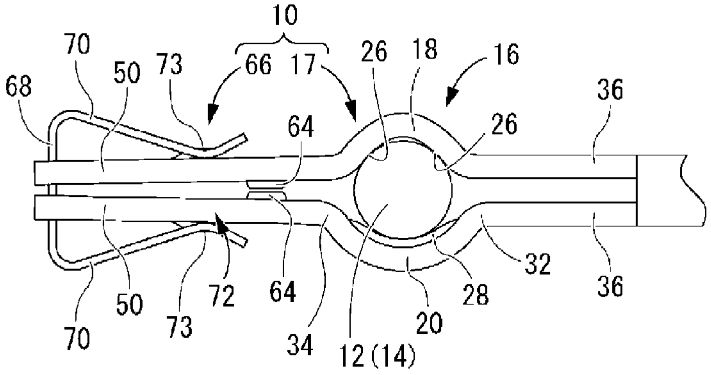
FIG. 7D is a diagram showing a model state where stress is relaxed due to aged deterioration and tips of the female terminal fitting are approaching each other.

If the connected state of the male and female terminals 12, 10 as described above continues for a long period of time, the tip parts of the tip side plate portions 50, 50 are displaced in the directions approaching each other due to stress relaxation. According to the female terminal 10 of the present disclosure, the large separation distance D between the tip parts of the tip side plate portions 50, 50 can be secured in FIG. 7C. Thus, even if the tip parts of the tip side plate portions 50, 50 are displaced in the directions approaching each other, the mutual contact of the tip parts of the tip side plate portions 50, 50 can be advantageously avoided as shown in FIG. 7D.

In the female terminal 10 of this embodiment, when the columnar connecting portion 14 is inserted into the tubular connecting portion 16, inward biasing forces in the vertical direction are applied to the first and second peripheral wall portions 18, 20 by the pressing pieces 70, 70 of the coil spring 66 and the columnar connecting portion 14 is inserted in a press-fit state into the tubular connecting portion 16. As a result, the contact pressure between the tubular connecting portion 16 and the columnar connecting portion 14 can be improved.

In the female terminal 10, the stopper portions 64, 64 facing each other are provided on the tip side plate portions 50, 50 facing each other in the vertical direction. In this way, as shown in FIG. 7B, the both stopper portions 64, 64 are in contact with each other in the initial state of the female terminal 10 (state where the coil spring 66 is mounted on the female terminal fitting 17). As a result, inward displacements in the facing directions of the tip side plate portions 50, 50 and the second circumferential end parts 34, 34 are limited, and it is avoided that the inner diameters ϕα, ϕβ in the tubular connecting portion 16 become smaller than necessary, for example, as compared to the case where the stopper portions are not provided and the tip parts of the tip side plate portions come into contact with each other at the time of mounting the coil spring. Therefore, an insertion resistance force can be suppressed to be small also when the columnar connecting portion 14 is inserted in the press-fit state into the tubular connecting portion 16.

Further, by providing the stopper portions 64, 64 on the tip side plate portions 50, 50, the tip parts of the tip side plate portions 50, 50 can be separated from each other by the predetermined separation distance C in the initial state of the female terminal 10 shown in FIG. 7B. As a result, in the inserted state of the male terminal 12 in the female terminal 10 shown in FIG. 7C, the tip parts of the tip side plate portions 50, 50 can be separated from each other by the even larger separation distance D. Thus, even if stress relaxation occurs due to aged deterioration as shown in FIG. 7D, the tip parts of the tip side plate portions 50, 50 do not contact each other and the biasing forces by the pressing pieces 70, 70 of the coil spring 66 are stably applied to the first and second peripheral wall portions 18, 20. In this way, even if the connected state of the male and female terminals 12, 10 continues for a long period of time, the connected state of the male and female terminals 12, 10 is stably maintained.

Note that, for example, to avoid the mutual contact of the tip parts of the tip side plate portions 50, 50 due to stress relaxation, it is also considered to change radially outward projecting angles of the tip side plate portions 50, 50 so that the facing gap between the tip side plate portions 50, 50 gradually increases toward the tip parts, instead of providing the stopper portions 64, 64. However, in that case, the inner diameters ϕα, ϕβ of the tubular connecting portion 16 are smaller than in the case of this embodiment. As a result, the insertion resistance force in inserting the columnar connecting portion 14 of the male terminal 12 into the tubular connecting portion 16 increases, which is not preferable. In contrast, since the stopper portions 64, 64 are provided in this embodiment, the separation distance C between the tip parts of the tip side plate portions 50, 50 can be larger than 0 at the time of mounting the coil spring 66 as shown in FIG. 7B. Therefore, it is possible to achieve both an effect of maintaining the connected state of the male and female terminals 12, 10 at the time of stress relaxation and an effect of reducing the insertion resistance of the male terminal 12 into the female terminal 10.

On the tip side plate portions 50, 50, the stopper portions 64, 64 are provided closer to the tubular connecting portion 16 than the parts to which the biasing forces by the coil spring 66 are applied (parts where the protrusions 56, 56 are formed). In this way, even if the tip parts of the tip side plate portions 50, 50 approach each other, for example, due to stress relaxation, displacement amounts of the tip side plate portions 50, 50 at the parts where the protrusions 64, 64 are formed are smaller than those at the tip parts. Further, for example, as compared to the case where the stopper portions 64 are provided on the tip parts of the tip side plate portions 50, the female terminal is less affected by working dimensional accuracy such as by bending the substantially strip-like metal flat plate constituting the female terminal fitting 17 and forming the first and second peripheral wall portions 18, 20. From these, tolerances of the stopper portions 64 can be reduced. As a result, the mutual contact of the tip parts of the tip side plate portions 50, 50 when stress relaxation occurs can be more reliably avoided. In this way, the biasing forces of the coil spring 66 are not dispersed according to the mutual contact of the stopper portions 64, 64 and are stably applied to the first and second peripheral wall portions 18, 20. Therefore, the connected state of the male and female terminals 12, 10 is stably maintained.

In the initial state of the female terminal 10 shown in FIG. 7B, the inner diameter ϕα of the tubular connecting portion 16 is substantially equal to or slightly larger than the outer diameter ϕγ of the columnar connecting portion 14 on the front side in the inserting direction of the male terminal 12. Further, the inner diameter ϕβ at the contact point portions of the tubular connecting portion 16 is slightly smaller than the outer diameter ϕγ of the columnar connecting portion 14. In this way, for example, when the columnar connecting portion 14 is inserted into the tubular connecting portion 16, the outer surface of the columnar connecting portion and the inner surface of the tubular peripheral wall portion do not come into contact with each other substantially over the entire surfaces and insertion resistance can be suppressed to be small by avoiding the press-fit state until the outer surface of the columnar connecting portion contacts the contact point portions of the tubular connecting portion 16. As a result, the peeling of plating provided on the male and female terminals 12, 10 is also suppressed.

The arcuate protrusion 28 extending in the circumferential direction is provided as the contact point portion of the tubular connecting portion 16 on the inner surface 24 of the second peripheral wall portion 20. In this way, the outer surface of the columnar connecting portion 14 and the inner surface 24 of the second peripheral wall portion 20 can be brought into contact with each other with a relatively large contact area. Further, the linear contact portions 26, 26 extending in the axial direction of the tubular connecting portion 16 are provided as the other contact point portions of the tubular connecting portion 16 on the inner surface 22 of the first peripheral wall portion 18. In this way, even if the columnar connecting portion 14 swings or twists with respect to the tubular connecting portion 16, the contact state of the columnar connecting portion 14 and the first peripheral wall portion 18 is maintained.

Particularly, in the tubular connecting portion 16, the lower contact point portion is provided in the circumferential central part of the inner surface 24 of the second peripheral wall portion 20 and the upper contact point portions are provided at two positions separated toward the both ends in the circumferential direction from the circumferential central part of the inner surface 22 of the first peripheral wall portion 18. In this way, the columnar connecting portion 14 can be supported at three points on a circumference on the inner surface of the tubular connecting portion 16, and the connected state of the male and female terminals 12, 10 is stably maintained. Particularly, in the arcuate protrusion 28 serving as the lower contact point portion in the tubular connecting portion 16, the surface on the front side (right side) in the inserting direction of the male terminal 12 is the curved surface 31. Therefore, insertion resistance when the male terminal 12 is inserted into the female terminal 10 can be reduced and an effect of preventing plating scrape can be achieved more.

The resilient member for applying biasing forces to the tip parts of the tip side plate portions 50, 50 in the directions approaching each other is constituted by the clip spring 66 including the coupling plate 68 and the pressing pieces 70, 70. In this way, the resilient member can be configured with a simple structure.

<Modifications>

Although the embodiment has been described in detail as a specific example of the present disclosure above, the present disclosure is not limited by this specific description. The present disclosure encompasses modifications, improvements and the like within such a range that the aim of the present disclosure can be achieved. For example, the following modifications of the embodiment are also included in the technical scope of the present disclosure.

(1) Although the stopper portions 64, 64 are provided on both of the pair of facing surfaces 62, 62 of the pair of tip side plate portions 50, 50 in the above embodiment, a stopper portion may be provided on a facing surface of one tip side plate portion and project toward a facing surface of the other tip side plate portion. In that case, the stopper portion may be configured to come into contact with the other tip side plate portion when a clip spring is mounted on a female terminal fitting and not to come into contact with the other tip side plate portion during the insertion of the male terminal and during stress relaxation.

(2) Although the stopper portions 64, 64 are located closer to the tubular connecting portion 16 than the parts to which biasing forces by the clip spring 66 are applied (parts where the protrusions 56, 56 are formed) in the tip side plate portions 50, 50 and provided in the parts less affected by a displacement of the female terminal 10 due to the stress relaxation of the material in the above embodiment, there is no limitation to this mode. The disposed position of the stopper portion on the tip side plate portion is not limited as long as the stopper portion comes into contact with the facing tip side plate portion or stopper portion when the clip spring is mounted on the female terminal fitting, does not come into contact with the facing tip side plate portion or stopper portion during the insertion of the male terminal and during stress relaxation and is located closer to the tubular connecting portion than the tip part.

(3) In the tubular connecting portion, the shapes of the contact point portions with the outer surface of the columnar connecting portion are not limited to those described in the above embodiment. For example, a contact point portion projecting radially inward may be provided on one inner surface, out of both inner surfaces of the first and second peripheral wall portions constituting the tubular connecting portion. Even if contact point portions projecting radially inward are provided on the both inner surfaces of the first and second peripheral wall portions, linear contact portions may be provided on the both inner surfaces or arcuate protrusions may be provided on the inner surfaces of both the first and second peripheral wall portions. Further, the linear contact portion may be provided at one position on the circumference or the linear contact portions may be provided at three or more positions separated from each other in the circumferential direction on the circumference on the inner surface of the first or second peripheral wall portion. Note that the linear contact portions and the arcuate protrusion are not essential in the present disclosure.

(4) Although the columnar connecting portion 14 of the male terminal 12 is inserted from right to left into the tubular connecting portion 16 of the female terminal 10 in the above embodiment, the columnar connecting portion 14 may be inserted from left to right.

(5) Although the stopper portions 64, 64 respectively have a flat and substantially cylindrical shape and the projecting tip surfaces thereof come into surface contact with each other when the both stopper portions come into contact with each other in the above embodiment, the shapes of the stopper portions are not limited to those described in the above embodiment. The stopper portion may have, for example, a hemispherical shape or, in projection in the vertical direction, have an elliptical shape, and may come into point or line contact with the facing tip side plate portion or stopper portion. For example, if the stopper portion comes into point contact, the contact and contact avoidance of the stopper portion with the facing tip side plate portion or stopper portion can be more accurately performed and the design, the dimensional control and the like of the female terminal can be facilitated.

LIST OF REFERENCE NUMERALS

10 female terminal
12 male terminal
14 columnar connecting portion
16 tubular connecting portion
17 female terminal fitting
18 first peripheral wall portion
20 second peripheral wall portion
22 inner surface (of first peripheral wall portion)
24 inner surface (of second peripheral wall portion)
26 linear contact portion (contact point portion)
28 arcuate protrusion (contact point portion)
30 recess
31 curved surface
32 first circumferential end part
34 second circumferential end part (circumferential end part)
36 base end side plate portion
38 coupling portion
40 crimping piece
42 wire
44 wire crimping portion
46 core wire
48 insulation coating
50 tip side plate portion
52 positioning protrusion
54 clip spring mounting portion
56 protrusion
58 vertical surface
60 inclined surface
62 facing surface
64 stopper portion
65 recess
66 clip spring (resilient member)
68 coupling plate
70 pressing piece
72 insertion opening
73 bent portion
74 locking recess

What is claimed is:

1. A female terminal, comprising:

a tubular connecting portion including a first peripheral wall portion and a second peripheral wall portion arranged to face each other, the tubular connecting portion being conductively connected to a columnar connecting portion of a male terminal;

a pair of tip side plate portions projecting radially outwardly of the tubular connecting portion from a pair of mutually facing circumferential end parts of the first and second peripheral wall portions while being separated from each other, the pair of tip side plate portions being deflectable and deformable in directions approaching each other;

a resilient member for applying biasing forces to the first and second peripheral wall portions in the directions approaching each other by biasing the pair of tip side plate portions in the directions approaching each other; and a stopper portion provided on at least one of a pair of facing surfaces of the pair of tip side plate portions, the stopper portion projecting toward the other facing surface, the stopper portion being provided at a position closer to the tubular connecting portion than tip parts of the pair of tip side plate portions and limiting displacements of the pair of tip side plate portions in the approaching directions to maintain the tip parts of the pair of tip side plate portions in a separated state by coming into contact with the other facing surface, and the pair of tip side plate portions and the first and second peripheral wall portions being separated and displaced in directions opposite to the approaching directions against the biasing forces of the resilient member, thereby allowing insertion of the columnar connecting portion of the male terminal into the tubular connecting portion.

2. The female terminal of claim 1, wherein the stopper portion is provided closer to the tubular connecting portion than parts of the pair of tip side plate portions having the biasing forces of the resilient member applied thereto.

3. The female terminal of claim 1, wherein:

at least one of the first and second peripheral wall portions includes a contact point portion projecting radially inward, and in the tubular connecting portion, an inner diameter at an end part on a front side in an inserting direction of the columnar connecting portion of the male terminal into the tubular connecting portion is larger than a radial dimension of the columnar connecting portion and an inner diameter in a part where the contact point portion is formed is smaller than the radial dimension of the columnar connecting portion.

4. The female terminal of claim 3, wherein both the first and second peripheral wall portions have an inner surface having an arcuate cross-sectional shape, an arcuate protrusion extending in a circumferential direction of the inner surface is provided on the inner surface of one of the first and second peripheral wall portions, and the contact point portion is constituted by the arcuate protrusion.

5. The female terminal of claim 4, wherein linear contact portions extending in an axial direction of the tubular connecting portion are provided at a plurality of positions separated in the circumferential direction on the inner surface of the other of the first and second peripheral wall portions, and the contact point portions are constituted by the linear contact portions.

6. The female terminal of claim 1, wherein:

the resilient member includes a coupling plate and a pair of pressing pieces projecting toward one side in a plate thickness direction of the coupling plate from both end parts of the coupling plate and inclined in directions approaching each other, and the resilient member is assembled with the pair of tip side plate portions while sandwiching the tip parts of the pair of tip side plate portions between the pair of pressing pieces.

* * * * *